July 6, 1954    R. H. SHENK    2,682,760
GEAR COUPLING

Filed April 18, 1950    2 Sheets-Sheet 1

INVENTOR.
ROBERT H. SHENK
BY
Florian G. Miller
Atty.

July 6, 1954  R. H. SHENK  2,682,760
GEAR COUPLING

Filed April 18, 1950  2 Sheets-Sheet 2

INVENTOR.
ROBERT H. SHENK
BY
Florian G. Miller
Atty.

Patented July 6, 1954

2,682,760

UNITED STATES PATENT OFFICE 2,682,760

GEAR COUPLING

Robert H. Shenk, Erie, Pa., assignor to American Flexible Coupling Company, Erie, Pa., a corporation of Pennsylvania Application April 18, 1950, Serial No. 156,599

2 Claims. (Cl. 64—9)

This invention relates generally to gear couplings and more particularly to novel gear teeth for the hub elements of a gear coupling to provide a coupling between adjacent ends of shafts so disposed as to permit axial and angular misalignment of the shafts within certain limits without decreasing the power transmission therebetween.

In transmitting power through normally aligned shafts, there is always a certain amount of misalignment therebetween. In the use of present couplings, there is a loss of efficiency of power transmission upon misalignment and there is excessive strain on the equipment. There is also excessive friction and consequent heat generated upon misalignment of the shafts in these couplings caused by the excessive relative sliding of the meshing gear teeth. With heavy loads, misalignment also causes an excessive amount of tooth failure in these couplings.

It is necessary to provide considerable backlash between the teeth in gears now used in couplings to prevent binding engagement between the flanks of one tooth and the flanks of the teeth on the meshing gear or sleeve. The principal trouble with teeth in prior couplings is that upon misalignment, engagement between the teeth of the gears and sleeves is localized at a point on the end of the teeth where the teeth have the least strength. This causes tooth failure in many instances.

It is, accordingly, an object of my invention to provide gears in a gear coupling subject to misalignment having novel teeth which are simple in construction, economical in cost, economical in manufacture, easy to form, and efficient in operation.

Another object of my invention is to provide novel gear teeth for a gear of a gear coupling which permit maximum surface contact between the side faces or flanks thereof and the side faces or flanks of teeth of the gear or sleeve in which they are in mesh.

Another object of my invention is to provide a coupling between adjacent ends of shafts which are normally aligned so disposed as to permit axial and/or angular misalignment of the shafts within certain limits.

Another object of my invention is to minimize the failure of the teeth of a gear in a gear coupling upon misalignment of the shafts connected to the coupling.

Another object of my invention is to provide novel teeth for the gears of a gear coupling which minimize backlash, binding, sliding, and excess friction despite misalignment of the shafts connected to the gears.

Another object of my invention is to provide a gear with novel gear teeth to provide maximum true rolling and slip free action of meshing points on the teeth upon misalignment of the shafts connected thereto.

Another object of my invention is to provide novel teeth for the gears of a gear coupling wherein meshing contact is transferred uniformly along the flank of each tooth in angling upon misalignment of the shafts to which the gears are connected.

Another object of my invention is to provide novel teeth for gears in a gear coupling in which tooth surfaces of a relatively large area are provided to transmit a maximum load with a minimum sized coupling.

Other objects of my invention will become evident from the following detailed description, taken in conjunction with the accompanying drawings, in which Fig. 1 is an enlarged fragmentary view of a hub tooth taken on the line 1—1 of Fig. 4;

Figure 1:
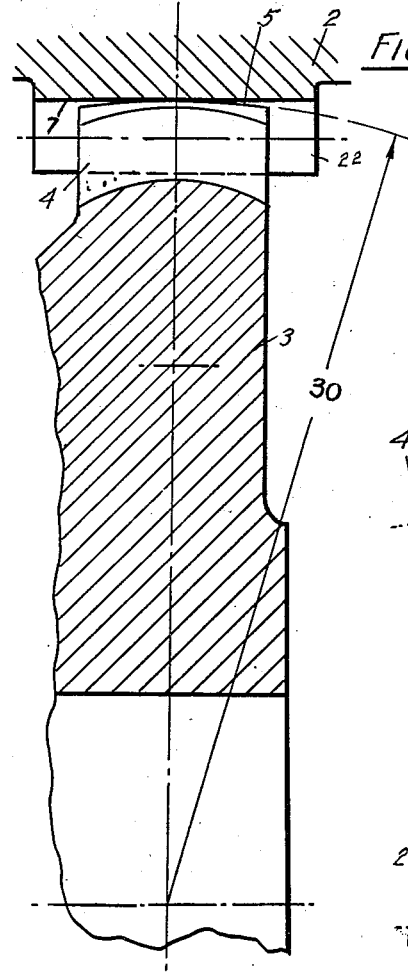
Figure 2:
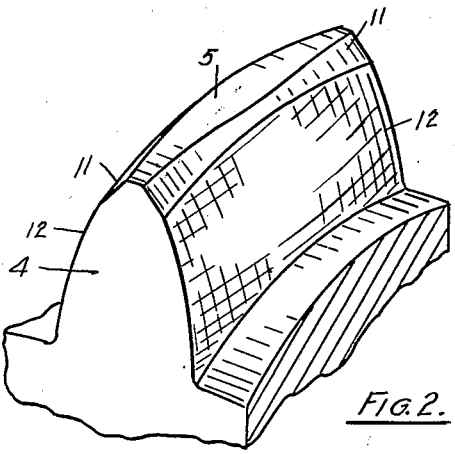
Fig. 2 is a fragmentary perspective view of a novel hub tooth in my novel gear coupling.
Figure 3:
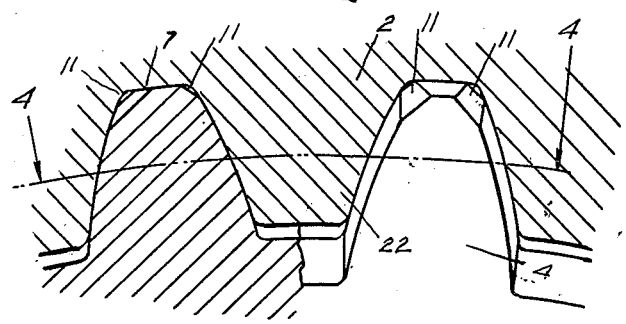
Fig. 3 is a fragmentary vertical sectional view taken on the line 3—3 of Fig. 4.
Figure 4:
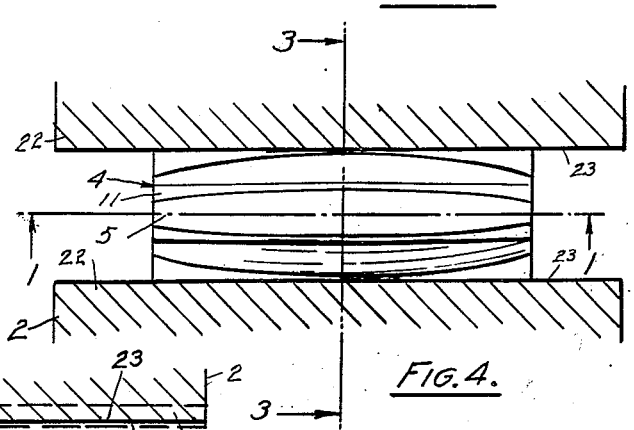
Fig. 4 is a view taken on the line 4—4 of Fig. 3.

It is desirable to have as large a combined area as possible to transmit torque between the teeth of gears or a gear and a sleeve so as to bring surfaces of a greater combined area into load transmitting relationship. This is difficult in a gear coupling when the shafts connected thereto become misaligned axially, laterally, or angularly. At least one of the gears of the coupling must therefore be so constructed that there is bearing and rocking contact for the transmission of torque around the entire peripheral circle of the teeth of the coupling when the shafts are misaligned to obviate backlash and particularly heavy stresses on individual teeth. This arrangement permits a greater degree of misalignment of the shafts, it eliminates vibration and noise, and it permits the use of higher speeds and torque.

Because of confusion in definitions in prior patents, in the trade and in texts relating to gears, I will define some of the terms which I will use in this specification. The circle passing through the outer ends of the teeth of the gear will be called the addendum circle and the circle passing through the bottom of the spaces or valleys between the teeth will be called the dedendum or root circle. The point which divides the line of centers of a pair of gears into two parts proportional to the number of teeth in the gears is called the pitch point. The circle drawn through the pitch point with the center of the axis of the gear is the pitch circle of the gear. The radius of the addendum circle minus the radius of the pitch circle is the addendum. The radius of the pitch circle minus the radius of the root circle is the dedendum. The dedendum plus the addendum is the radial length of the tooth. That portion of the tooth curve which is outside the pitch circle is sometimes called the face of the tooth or tooth face. The part of the tooth curve inside the pitch circle is sometimes called the flank of the tooth. I will use the words "side face" or "flank" to include both the heretofore defined tooth face and the flank. The part of the flank which comes in contact with the face of the tooth of the other gear is called the acting flank. Clearance is the distance measured on the line of centers between the addendum circle of one gear and the root circle of the other when they are in mesh. When the width of a tooth measured on the pitch circle is less than the width of the space between the teeth of the gear with which it is in mesh, the difference between the width of space and the width of tooth is called the backlash. The distance from the center of one tooth to the center of the next tooth measured on the pitch circle is called the circular pitch. The pitch circle is the circle that represents a smooth disk that would transmit by friction the desired relative motion between the gears. The tip of a tooth is the top thereof on the addendum circle. In the case of an external gear, the tips of the teeth is the outside diameter thereof and in the case of an internal gear, the inside diameter.

In order to compensate for angular misalignment between the hub and the sleeve of a coupling after continuous gear mesh, it is necessary in gear type couplings that a backlash be provided so as to allow for angular movement of the hub teeth with respect to the internal teeth or splines of the sleeve. In addition to the foregoing backlash, it is essential that the floating sleeve telescoped over the gears of a coupling be held in positive position radially so as to eliminate the possibility of flutter and vibration. I solve this problem by the use of basically standard involute internal gear teeth or splines 1 in a sleeve 2 and novel involute gear teeth 4 on the gear or hub 3 shown in Figs. 1 to 6 inclusive, which will be more fully described hereafter. The basic features of my hub tooth design are shown in Figs. 1 to 5 inclusive. The tips 5 of the teeth 4 are preferably crowned to conform to the section of a sphere whose center is at the axis of the hub 3 having a radius indicated by the line 30 and in a plane extending transversely of said axis and substantially midway of the length of the teeth. The convex tips 5 serve to pilot the sleeve 2 with a ball and socket action. Ordinarily, gear teeth running in mesh are provided with a substantial clearance between the tips of the teeth on one gear and the roots of the teeth on the meshing gear. This clearance prevents interference of the involute face of the teeth near the tips thereof with the non-involute fillets joining the flank and root of the mating teeth. The teeth 4 on the hub 3 are designed differently than normally designed involute teeth inasmuch as the tips 5 of the hub teeth 4 are extended to engage the roots 7 of the sleeve teeth or splines 1 so as to accurately pilot the sleeve 2. Unless the tips 5 of the hub teeth 4 are modified from standard involute teeth, there will be interference at this point. I therefore increase the length of my teeth at the tip thereof equal to a distance which is normally the clearance between the end of a normal tooth and the root of a meshing tooth. The edges of this extension forming the tip 5 of the teeth 4 are chamfered at 11 to eliminate interference and to allow the true involute side faces 12 to engage to transfer the power most efficiently. The side faces 12 of the external hub teeth 4 are crowned in planes normal to the involute side faces or flanks 12 thereof and parallel to the axis of the hub 3 so that the resulting tooth thickness is greater at the midpoint thereof than at the ends thereof. This is paricularly shown in Figs. 2 and 4. The amount of the crown on the side faces or flanks 12 of the teeth 4 varies with the desired application of the gear coupling. For normal commercial applications, the crown is relatively slight, being just sufficient to prevent end bearing of the teeth at the maximum recommended misalignment but small enough so that the maximum contact ellipse will be obtained between the flanks 12 of the teeth 4 and that of the engaging standard internal teeth 1 on the sleeve 2 when the coupling is carrying greater loads. This design greatly improves the contact pattern at the teeth and their load carrying capacity. It also reduces the backlash necessary to accommodate maximum misalignment.

Figure 5:
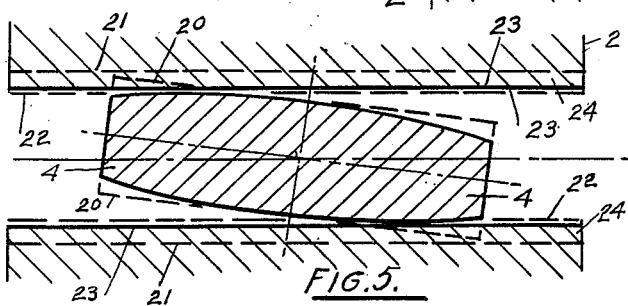
Fig. 5 is a fragmentary sectional view of misaligned meshing teeth and overlying dotted lines to show the outline of meshing teeth formed in a conventional manner.
Figure 6:
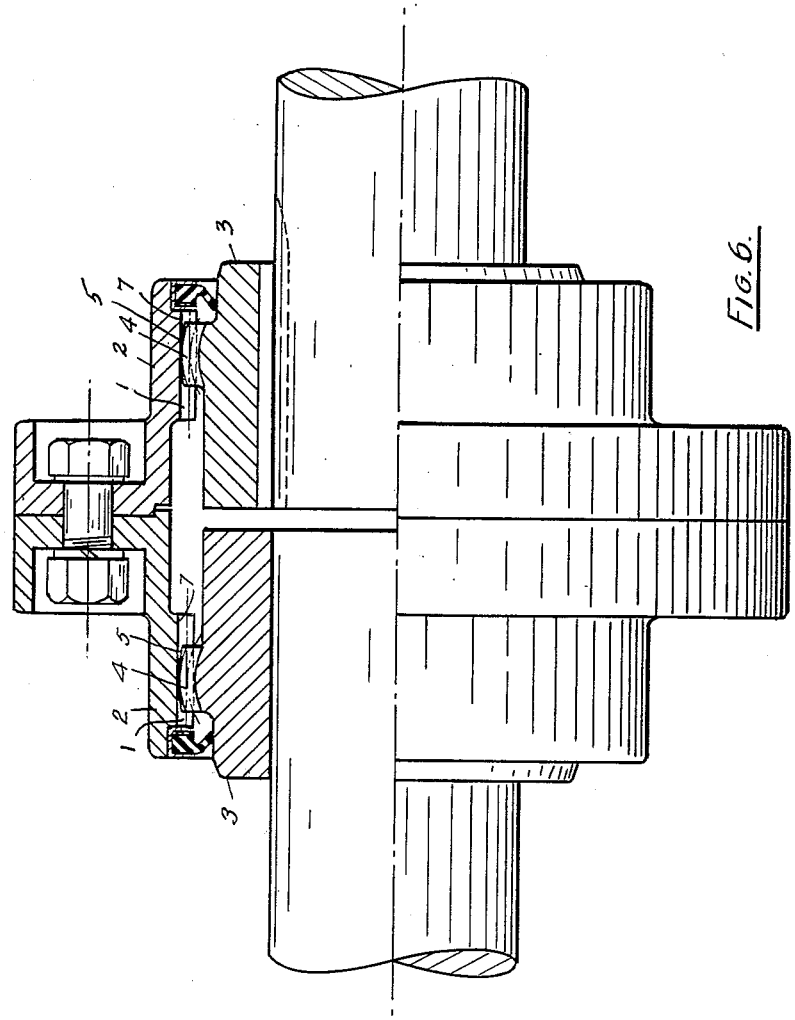
Fig. 6 is a side elevational view of my novel coupling broken away on the center line thereof.

In Fig. 5, I have shown dash lines 20 and 21 superimposed on my novel gear teeth 4 and meshing teeth 24. Dash lines 20 give an outline of a tooth of standard involute tooth design. Dash lines 21 designate the engaging sides of splines or teeth for mesh with the standard tooth outlined by dash lines 20. The dash lines 22 are aligned tangent to the outermost portion of my novel gear tooth 4. It will be seen that by comparing the distance between the dash lines 22 and the solid line 23 representing the side face of the internal teeth or splines 24 of a sleeve, with the distance between the dash line 22 and the dash line 21, a comparison may be made between the amount of clearance necessary with the use of my novel tooth design and that necessary with the use of a conventional tooth design. A comparison can also be made between the load carrying area of engaging teeth with my novel tooth design under a misaligned condition and that of an ordinary tooth design under the same condition. It will be noted that with my novel tooth design the engaging load carrying surface is well in from the ends of the teeth. The contact area of the tooth form is theoretically a point in a plane parallel with the axis of the hub and a line approximating an involute curve taken in a plane perpendicular to the axis of the hub and through the point of contact. Under load, this contact becomes an area approximating an ellipse in shape. The curvature of the external tooth is chosen to make the area of contact a maximum. By providing the chamfer, this prevents the contact area from extending from the edge of the chamfer adjacent the flank tooth to the tip of the tooth, thereby reducing bending stress in the tooth and risk of fatigue failure and, at the same time, permits piloting of the sleeve on the hub teeth tips.

Backlash is held to a minimum in my novel tooth design thereby decreasing sliding action between the teeth and making the action in my novel teeth closely approach a pure rolling action. In ordinary applications, the amount of backlash necessary to accommodate the misalignment is negligible with the use of my novel design.

In my novel coupling, one hub may be misaligned, both hubs may be misaligned or the sleeve, where the floating type is used, may be misaligned to provide for misalignment of the shafts. My novel coupling provides for parallel misalignment of the shafts, angular misalignment of the shafts, or a combination of both.

The longitudinally curved crowns on the flanks 12 of my novel teeth 4 are generated by a cutting tool moving in and out across the flanks 12 of the teeth 4. The crowns of the tips 5 are preferably taken from an equatorial zone of a sphere. This minimizes slipping or friction radially because of the mesh on the pitch circle between the engaging teeth. The flanks 12 of the teeth 4 of my novel hubs 3 are so constructed that full meshing contact is transferred along the face of each meshing tooth where the shafts are misaligned. No matter what the angle of misalignment is, there is practically no friction in a radial direction since every point on the pitch line from one end face of a tooth to the other lies in a circle. Meshing points on the flanks 12 of the teeth 4 of the hub do not vary in radius from the center thereof during misalignment. Heat generated by friction is minimized in my novel coupling.

With the extensions or tips on my novel teeth not provided for on standard teeth, it will be evident that the involute curve of the side faces 12 of the teeth 4 will be extended thereby giving a maximum rolling action between the teeth. The side faces or flanks 12 of my teeth are preferably a standard involute although any other suitable forms may be used.

It will be evident from the foregoing description that I have provided a novel gear coupling with gears having novel gear teeth so constructed as to permit offset parallel misalignment, angular misalignment, and a combination of both, of connected shafts within certain limits, and a novel coupling which provides an efficient transfer of power with a minimum of friction, backlash, binding, and generated heat upon misalignment of the shafts to which the coupling is connected.

Various changes may be made in the specific embodiment of my invention without departing from the spirit thereof or from the scope of the appended claims.

What I claim is:

1. A flexible shaft coupling for coupling two shafts subject to misalignment comprising a hub member and a sleeve member, gear teeth on said hub member intermeshing with gear teeth on said sleeve member, the tips of said teeth on said hub member being curved, the center of the radius of curvature of the tips of said teeth lying on the axis of said hub, the edges of the tips of said gear teeth being chamfered, said chamfered edges meeting the tooth face along a curve whose center lies on a line drawn from the axis of the hub to the center of the tip of the tooth and spaced from the axis of the hub nearer to said tips than to said hub axis and the root surface of the tooth curved about the same center, the pitch surface of the tooth being convex and curving outward and the thickness of the hub teeth decreasing in a radial outward direction, the tips of the teeth of said hub member adapted to engage the root surfaces of meshing teeth of said sleeve member for piloting said sleeve member.

2. A flexible shaft coupling for connecting two shafts subject to misalignment comprising two hub members and a sleeve member, gear teeth on said hub members intermeshing with gear teeth on said sleeve member, the tips of said teeth on said hub members being curved, the center of the radius of curvature of the tips of said teeth lying on the axis of said hubs, the edges of the tips of said gear teeth being chamfered, said chamfered edges meeting the tooth face along a curve whose center lies on a line drawn from the axis of the hubs to the center of the tip of the tooth and spaced from the axis of the hubs nearer to said tips than to said hub axis and the root surface of the tooth curved about the same center, the pitch surface of the tooth being convex and curving outward and the thickness of the hub teeth decreasing in a radial outward direction, the tips of the teeth of said hub members adapted to engage the root surfaces of meshing teeth of said sleeve member for piloting said sleeve member.

References Cited in the file of this patent

UNITED STATES PATENTS

| Number | Name | Date |
|---|---|---|
| 1,891,285 | Loewus | Dec. 20, 1932 |
| 2,035,171 | Loewus | Mar. 24, 1936 |
| 2,035,434 | Loewus | Mar. 24, 1936 |